(12) United States Patent
Inoue et al.

(10) Patent No.: US 7,865,929 B1
(45) Date of Patent: Jan. 4, 2011

(54) RECEIVING APPARATUS OF DIGITAL BROADCASTING AND DISPLAY METHOD OF RECORDING PROGRAM ASSOCIATED INFORMATION

(75) Inventors: Hajime Inoue, Chiba (JP); Tatsuya Wakahara, Tokyo (JP); Naoki Murayama, Tokyo (JP); Masao Mizutani, Kanagawa (JP); Yasuaki Ohta, Aichi (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/600,003

(22) PCT Filed: Nov. 10, 1999

(86) PCT No.: PCT/JP99/06242

§ 371 (c)(1),
(2), (4) Date: Jul. 10, 2000

(87) PCT Pub. No.: WO00/30351

PCT Pub. Date: May 25, 2000

(30) Foreign Application Priority Data

Nov. 12, 1998 (JP) ................................. 10-322299
Nov. 24, 1998 (JP) ................................. 10-333255

(51) Int. Cl.
 *H04N 7/16* (2006.01)
(52) U.S. Cl. ........................ 725/151; 725/152; 725/146
(58) Field of Classification Search .................... 725/37, 725/141, 153, 133, 151; 386/83, 95, 68, 386/94
See application file for complete search history.

(56) References Cited

U.S. PATENT DOCUMENTS

| 5,164,839 | A | * | 11/1992 | Lang ............................ 386/54 |
| 5,541,738 | A | * | 7/1996 | Mankovitz .................... 725/58 |
| 5,621,579 | A | * | 4/1997 | Yuen .......................... 386/121 |
| 5,761,371 | A | * | 6/1998 | Ohno et al. ................... 386/46 |

(Continued)

FOREIGN PATENT DOCUMENTS

EP    692790    1/1996

(Continued)

OTHER PUBLICATIONS

Browne et al., Large Capacity Random Access Multi-Source Record Player, International Publication Date: Dec. 12, 1992 International Publication No. WO 92/22983.*

*Primary Examiner*—Joseph P. Hirl
*Assistant Examiner*—Mushfikh Alam
(74) *Attorney, Agent, or Firm*—Lerner, David, Littenberg, Krumholz & Mentlik, LLP

(57) ABSTRACT

When an analog-recorded tape cassette is loaded into an apparatus which can perform an analog recording/reproduction and a digital recording/reproduction by a same video tape and is reproduced, an alarm is displayed. When a tape cassette in which a transport stream of different specifications or a digital video signal of a system other than the MPEG2 system has been recorded is loaded into the apparatus and reproduced, an alarm is displayed. The user watches a smart file picture plane and recognizes recording system information of a program to be monitored from now on. If the program to be reproduced has been digitally recorded, the user switches the input to a digital video input. If the program to be reproduced has been analog-recorded, the user switches the input to an analog video input.

10 Claims, 12 Drawing Sheets

| VCR STATUS | | DISPLAY OF CONTROL PANEL | | | | NON-DISPLAY OF CONTROL PANEL | | | |
|---|---|---|---|---|---|---|---|---|---|
| | | IMAGE | AUDIO | STATION SELECT | ALARM DISPLAY | IMAGE | AUDIO | STATION SELECT | ALARM DISPLAY |
| IEEE1394 | STOP | RECEIVED IMAGE | RECEIVED SOUND | O | | RECEIVED IMAGE | RECEIVED SOUND | O | |
| | RECORDING PAUSE | RECEIVED IMAGE | RECEIVED SOUND | O | | RECEIVED IMAGE | RECEIVED SOUND | O | |
| | RECORD | RECEIVED IMAGE | RECEIVED SOUND | × | O | RECEIVED IMAGE | RECEIVED SOUND | × | O |
| ANALOG | STOP | GRAY | NO SOUND | × | O | RECEIVED IMAGE | RECEIVED SOUND | O | |
| | RECORDING PAUSE | GRAY | NO SOUND | × | O | RECEIVED IMAGE | RECEIVED SOUND | O | |
| | RECORD | GRAY | NO SOUND | × | O | RECEIVED IMAGE | RECEIVED SOUND | O | |

U.S. PATENT DOCUMENTS

| | | | | |
|---|---|---|---|---|
| 5,990,940 A | * | 11/1999 | Hashimoto et al. | 348/184 |
| 6,141,488 A | * | 10/2000 | Knudson et al. | 386/83 |
| 6,147,715 A | * | 11/2000 | Yuen et al. | 348/565 |
| 6,169,843 B1 | * | 1/2001 | Lenihan et al. | 386/46 |
| 6,292,618 B1 | * | 9/2001 | Ohara et al. | 386/46 |
| 6,418,169 B1 | * | 7/2002 | Datari | 375/240.28 |
| 6,556,776 B1 | * | 4/2003 | Ochi et al. | 386/124 |
| 6,678,462 B1 | * | 1/2004 | Chihara | 386/83 |
| 6,754,715 B1 | * | 6/2004 | Cannon et al. | 709/231 |
| 7,224,886 B2 | * | 5/2007 | Akamatsu et al. | 386/83 |
| 2002/0018638 A1 | * | 2/2002 | Sparks et al. | 386/46 |
| 2004/0208482 A1 | * | 10/2004 | Suga et al. | 386/95 |
| 2005/0229213 A1 | * | 10/2005 | Ellis et al. | 725/58 |

FOREIGN PATENT DOCUMENTS

| | | | |
|---|---|---|---|
| EP | 0710021 | | 5/1996 |
| JP | 3-166876 A | | 7/1991 |
| JP | 4-074075 A | | 3/1992 |
| JP | 4-326880 A | | 11/1992 |
| JP | 7-007679 A | | 1/1995 |
| JP | 8-249758 A | | 9/1996 |
| JP | 9-312811 A | | 12/1997 |
| JP | 10-125013 A | | 5/1998 |
| JP | 10-294922 A | | 11/1998 |
| WO | WO 92/22983 | * | 12/1992 |
| WO | WO-97/00579 | | 1/1997 |
| WO | WO-97/10678 | | 3/1997 |

* cited by examiner

Fig. 4A

| VCR STATUS | | DISPLAY OF CONTROL PANEL | | | | NON-DISPLAY OF CONTROL PANEL | | | |
|---|---|---|---|---|---|---|---|---|---|
| | | IMAGE | AUDIO | STATION SELECT | ALARM DISPLAY | IMAGE | AUDIO | STATION SELECT | ALARM DISPLAY |
| IEEE1394 | STOP | RECEIVED IMAGE | RECEIVED SOUND | ○ | | RECEIVED IMAGE | RECEIVED SOUND | ○ | |
| | RECORDING PAUSE | RECEIVED IMAGE | RECEIVED SOUND | ○ | | RECEIVED IMAGE | RECEIVED SOUND | ○ | |
| | RECORD | RECEIVED IMAGE | RECEIVED SOUND | × | ○ | RECEIVED IMAGE | RECEIVED SOUND | × | ○ |
| ANALOG | STOP | GRAY | NO SOUND | × | ○ | RECEIVED IMAGE | RECEIVED SOUND | ○ | |
| | RECORDING PAUSE | GRAY | NO SOUND | × | ○ | RECEIVED IMAGE | RECEIVED SOUND | ○ | |
| | RECORD | GRAY | NO SOUND | × | ○ | RECEIVED IMAGE | RECEIVED SOUND | ○ | |

Fig. 4B

| VCR STATUS | DISPLAY OF CONTROL PANEL | | | NON-DISPLAY CONTROL PANEL | | | |
|---|---|---|---|---|---|---|---|
| | IMAGE | AUDIO | STATION SELECT | ALARM DISPLAY | IMAGE | AUDIO | STATION SELECT | ALARM DISPLAY |
| DIGITAL | REPRODUCED IMAGE | REPRODUCED SOUND | × | | REPRODUCED IMAGE | REPRODUCED SOUND | × | |
| ANALOG | GRAY | NO SOUND | × | ○ | GRAY | NO SOUND | × | ○ |

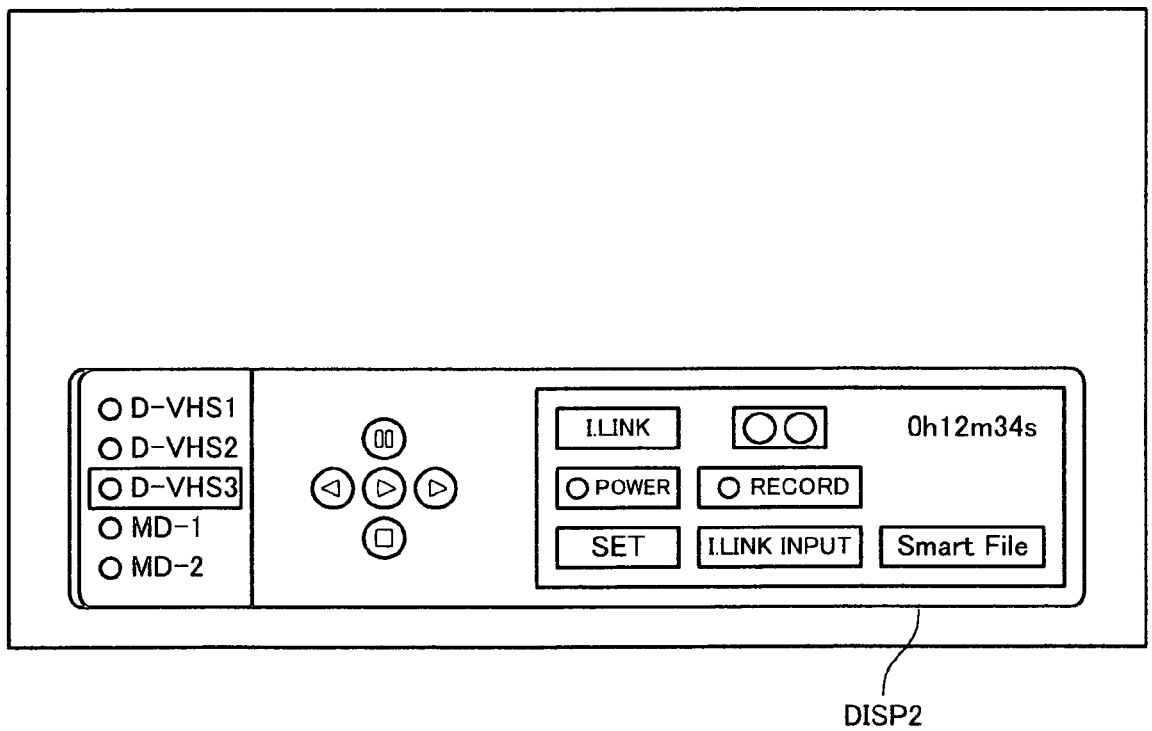

Fig. 8

| DIGITAL VTR | | | MS | | |
|---|---|---|---|---|---|
| MAIN CLASSIFI-CATION | FINE CLASSIFI-CATION | NAME OF GENRE TO BE DISPLAYED ON SMART FILE | MAIN CLASSIFI-CATION | FINE CLASSIFI-CATION | NAME OF GENRE FROM BROADCASTER |
| 0X0 | 0X0 | SPACIAL | | | |
| | 0X1 to 0XF | | | | |
| 0X1 | 0X0 | MOVIE | 0X0<br>0X1 | 0X0 to 0XF<br>0X0 to 0XF | JAPANESE MOVIE<br>FOREIGN MOVIE |
| | 0X1 to 0XF | | | | |
| 0X2 | 0X0 | NEWS | 0X6 | 0X0 to 0XF | NEWS/REPORT |
| | 0X1 to 0XF | | | | |
| 0X3 | 0X0 | SHOW | | | |
| | 0X1 to 0XF | | | | |
| 0X4 | 0X0 | SPORTS | 0X2<br>0X3 | 0X0 to 0XF<br>0X0 to 0XF | SPORTS 1<br>SPORTS 2 |
| | 0X1 to 0XF | | | | |
| 0X5 | 0X0 | FOR CHILDREN | 0X9 | 0X0 to 0X7 | FOR CHILDREN/EDUCATION |
| | 0X1 | ANIMATION | 0X9 | 0X0 0X1 | JAPANESE ANIMATION/FOREIGN ANIMATION |
| | 0X2 to 0XF | | | | |
| 0X6 | 0X0 | MUSIC | 0X4 | 0X0 to 0XF | MUSIC |
| | 0X1 to 0XF | | | | |
| 0X7 | 0X0 | ART/CALTURE | 0XA | 0X0 to 0XF | CULTURE/DOCUMENTARY |
| | 0X1 to 0XF | | | | |
| 0X8 | 0X0 | SERIES | | | |
| | 0X1 to 0XF | | | | |
| 0X9 | 0X0 | EDUCATION | 0X9 | 0X8 to 0XF | FOR CHILDREN/EDUCATION |
| | 0X1 to 0XF | | | | |
| 0XA | 0X0 | HOBBY | 0X8 | 0X0 to 0XF | LEISURE/HOBBY |
| | 0X1 to 0XF | | | | |
| 0XB | 0X0 to 0XF | | | | |
| 0XC | 0X0 to 0XF | | | | |
| 0XD | 0X0 | SHOPPING | 0X7 | 0X1 | SHOPPING(VARIETY) |
| | 0X1 to 0XF | | | | SHOPPING(OTHERS) |
| 0XE | 0X0 | VARIETY | 0X7 | 0X0 0X2 to 0XF | VARIETY |
| | 0X1 to 0XF | | | | |
| 0XF | 0X0 | | | | |
| | 0X1 | DRAMA | 0X5 | 0X0 to 0XF | DRAMA |
| | 0X2 | | | | |
| | 0X3 | | | | |
| | 0X4 to 0XF | | | | |
| | 0XE | OTHERS | | | OTHER THAN THE ABOVE |
| | 0XF | <NOT DISPLAYED> | | | |

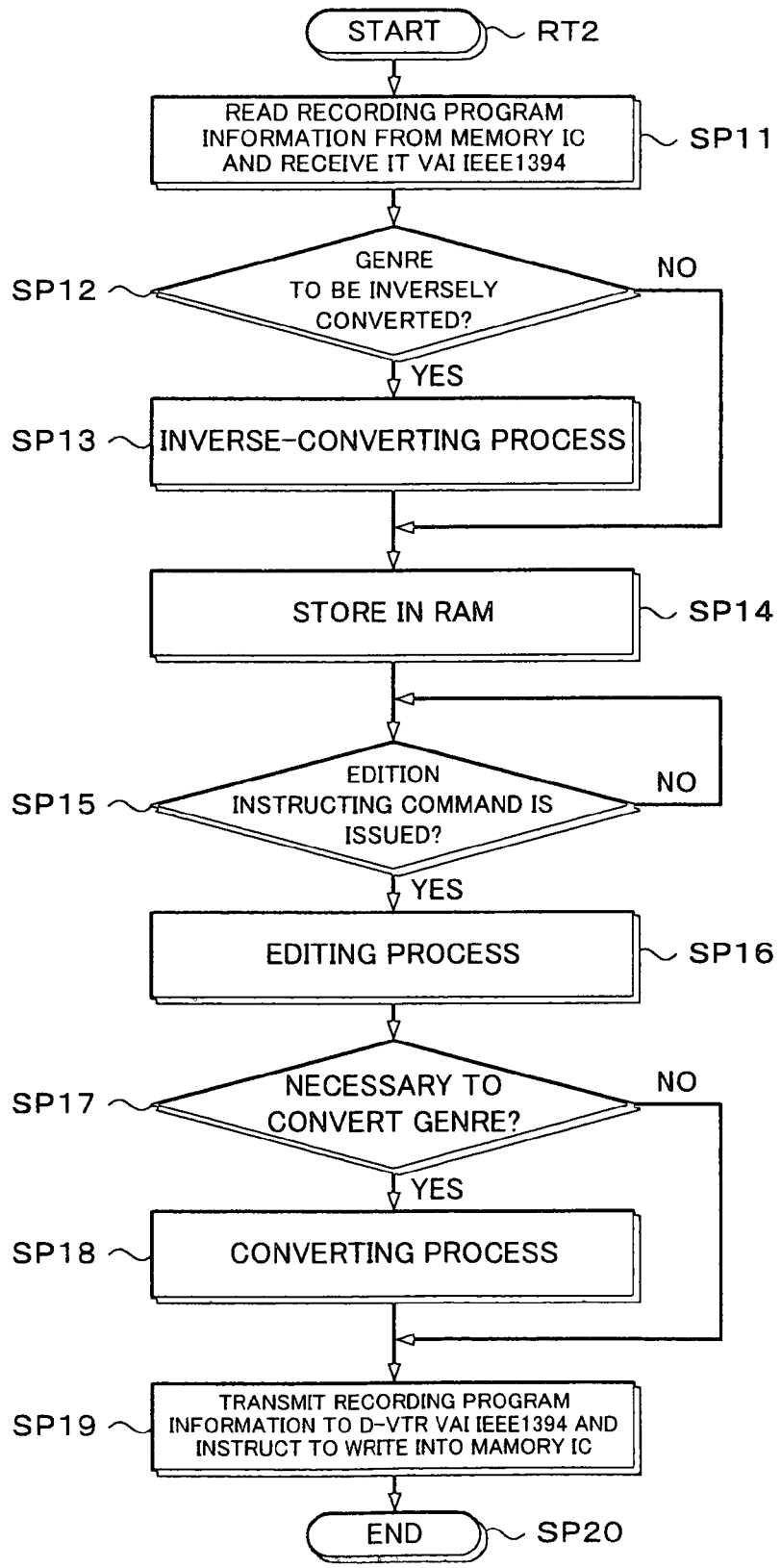

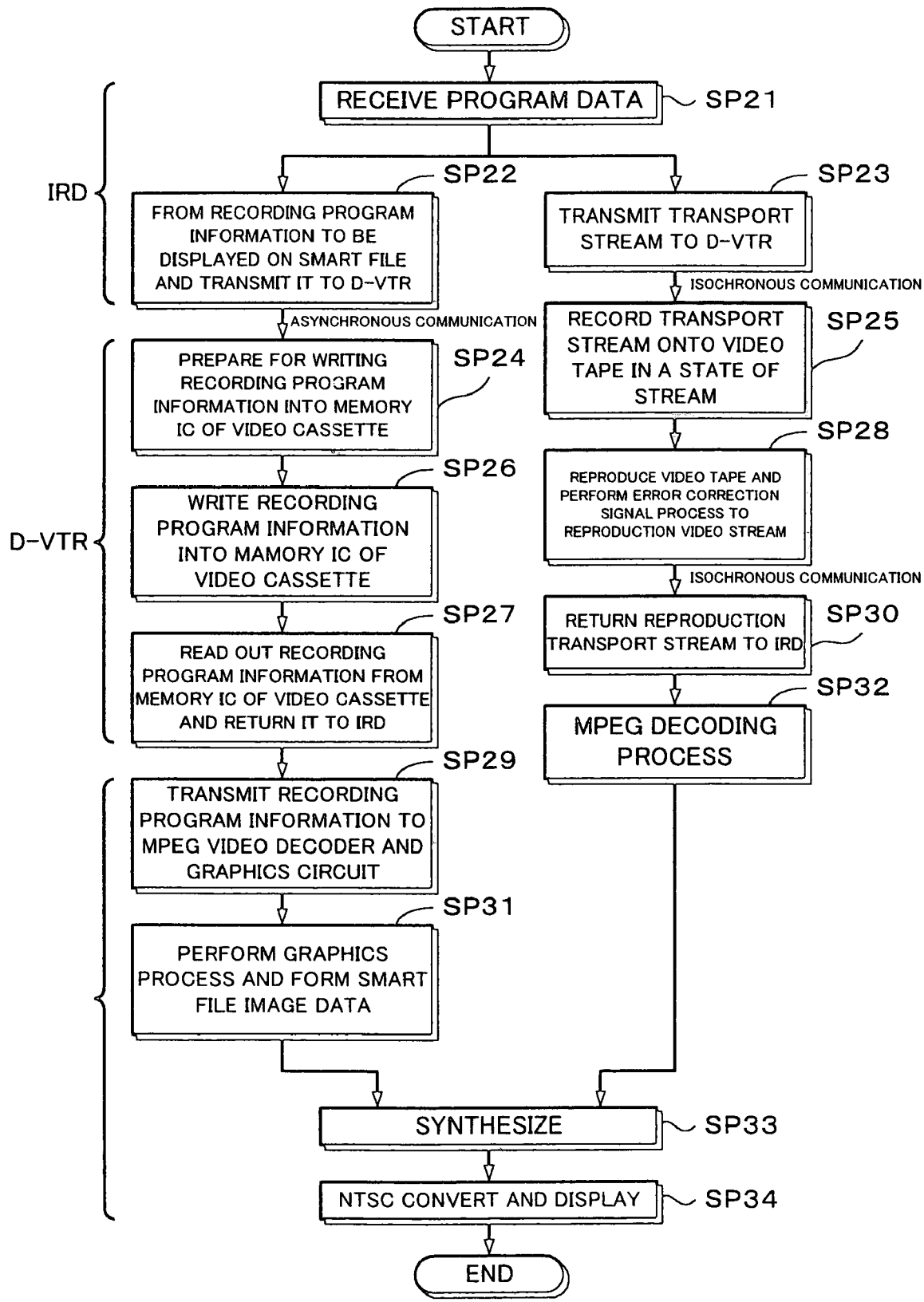

RECEIVING APPARATUS OF DIGITAL BROADCASTING AND DISPLAY METHOD OF RECORDING PROGRAM ASSOCIATED INFORMATION

TECHNICAL FIELD

The invention relates to a program receiving apparatus, for example, a receiving apparatus of a digital broadcasting in a digital broadcasting system and to a display method of recording program associated information.

BACKGROUND ART

In recent years, IEEE1394 has started to spread as an interface for transferring video data or audio data between digital video apparatuses or between digital audio apparatuses at a high speed. According to IEEE1394, an isochronous transfer mode and an asynchronous transfer mode are supported. In the isochronous transfer mode, a delay time of transmission is guaranteed and it is suitable when it is used to transfer a data stream such as video data or audio data which is continuous with respect to time at a high speed. In the asynchronous transfer mode, it is guaranteed to certainly transmit data to a node on the partner destination side and it is suitable when it is used to certainly transfer data such as command, status, or the like.

In recent years, a digital satellite broadcasting has started to spread. In the digital satellite broadcasting, digital video data and audio data are compressed by an MPEG2 system and packetized to a predetermined format. A packet identifier called a PID is provided for a header of a transmission packet. Video packets and audio packets of a plurality of programs are multiplexed to a same stream and transmitted.

When such a digital satellite broadcasting is received, a decoder for receiving a digital satellite broadcasting called an IRD (Integrated Receiver Decoder) is connected to a television receiver. A signal of the digital satellite broadcasting received by a parabolic antenna is supplied to the IRD. A transport stream of MPEG2 is demodulated by the IRD. The video packet and audio packet of a desired program are extracted by the PID from the transport stream of MPEG2. A video signal and an audio signal are decoded from the video packet and audio packet. The video signal and audio signal are supplied from the IRD to the television receiver.

A method whereby the interface of IEEE1394 is provided for the IRD has been proposed in order to receive such a digital satellite broadcasting. If the interface of IEEE1394 is provided for the IRD, a receiving and recording/reproducing system of a digital satellite broadcasting can be constructed by connecting the IRD to a digital apparatus such as a digital video recording/reproducing apparatus or the like. By constructing such a system, the transport stream of MPEG2 transmitted by the digital satellite broadcasting can be recorded/reproduced as it is.

That is, upon recording, the transport stream of MPEG2 received on the IRD side is sent to the digital video recording/reproducing apparatus via the interface of IEEE1394. The transport stream of MPEG2 is recorded as it is to a tape cassette by the digital video recording/reproducing apparatus. Upon reproduction, the transport stream of MPEG2 is reproduced from the tape cassette. The reproduced transport stream of MPEG2 is sent to the IRD via the interface of IEEE1394. The MPEG stream is decoded by the IRD.

As a digital video cassette recording/reproducing apparatus in the receiving and recording/reproducing system of the digital satellite broadcasting such that the transport stream of MPEG2 transmitted by the digital satellite broadcasting is recorded/reproduced as it is, the use of an apparatus which can perform a digital recording and an analog recording of data to a similar tape cassette can be taken into consideration. In such a kind of digital video cassette recording/reproducing apparatus, the transport stream of MPEG2 transmitted by the digital satellite broadcasting can be recorded/reproduced as it is to/from the tape cassette and the video signal can be recorded/reproduced to/from a similar tape cassette in an analogwise manner. Therefore, the existing video sources can be widely used.

In such a system, however, since the digital recording and the analog recording can be performed to one tape cassette, the user cannot discriminate whether a program which he wants to reproduce and monitor is the program which was digitally recorded or analog-recorded. There is a case where the user becomes confused.

Therefore, for example, in the case where the user loads the analog-recorded tape cassette into the digital video cassette recording/reproducing apparatus and reproduces it without knowing that the program has been analog-recorded, since the signal is transmitted as a digital signal between the digital video cassette recording/reproducing apparatus and the IRD via the interface of IEEE1394, the reproduction signal from the digital video cassette recording/reproducing apparatus is not sent to the IRD and a reproduction picture plane cannot be displayed by the television receiver via the IRD. In this case, although it is necessary to switch the inputs of the television receiver so that the output of the digital video cassette recording/reproducing apparatus is directly sent to the television receiver, most of the users are not aware of it. Consequently, there is such a possibility that when the analog-recorded tape cassette is loaded, a picture plane is not displayed on the television receiver and the user becomes confused. Particularly, in the case where the digital signal of the transport stream and the analog video signal have been mixedly recorded in the same tape cassette, when the portion of the analog video signal is reproduced, it happens that the picture plane suddenly becomes unseen.

There are a plurality of satellites which provide services of the digital satellite broadcasting and the services of further more digital satellite broadcastings will be started in future. Although the services of the digital satellite broadcasting which are provided at present fundamentally use the transport stream of the MPEG2 system, a broadcasting signal differs or the detailed specifications differ like a digital HDTV signal of BS. Further, in the future digital satellite broadcasting services, it is considered that the specifications will be different. Therefore, there is such a possibility that a tape cassette in which a transport stream of different specifications has been recorded is loaded into the digital video recording/reproducing apparatus of the system. If the tape cassette in which the transport stream of the different specifications has been recorded is loaded and reproduced, the reproduction signal cannot be decoded by the IRD and a reproduction picture plane cannot be displayed on the television receiver via the IRD. Therefore, there is such a possibility that the user becomes confused.

Further, a plurality of digital video apparatuses can be connected in accordance with IEEE1394. Among the digital video apparatuses, there is an apparatus of the system in which, for example, a digital video signal is compressed without using the MPEG2 system and recorded. Even in the case where the digital video signal of a system other than the MPEG2 system is inputted to the IRD, the input signal cannot be decoded in the IRD and a reproduction picture plane cannot be displayed on the television receiver via the IRD. Therefore, there is such a possibility that the user becomes confused.

It is, therefore, an object of the invention to provide a receiving apparatus of a digital broadcasting, in which when a tape cassette which was analog-recorded or digitally recorded, a tape cassette in which a digital video signal of a system other than the MPEG2 system has been recorded, or a tape cassette in which a television broadcasting signal of different specifications has been recorded is reproduced, it is possible to cope with such a reproduction without making the user confused, and to provide a display method of recording program associated information for such an apparatus.

DISCLOSURE OF INVENTION

To solve the above problem, according to the invention, there is provided a receiving apparatus of a digital broadcasting for receiving a digital broadcasting signal constructed by a transport stream in which video data and audio data have been compressed and multiplexed, comprising: a decoder for decoding the received digital broadcasting signal; an interface for receiving the transport stream from a reproducing apparatus; and a display processing circuit for displaying program associated information recorded on a recording medium loaded in the reproducing apparatus by a predetermined format.

BRIEF DESCRIPTION OF DRAWINGS

FIGS. 4A and 4B are schematic diagrams showing the relation between the operating mode of the digital video cassette recording/reproducing apparatus and the operation of the IRD;

FIG. 5 is a schematic diagram showing an example of a control panel;

FIG. 8 is a schematic diagram showing a genre correspondence table;

FIG. 9 is a flowchart showing an editing processing procedure of the program recording information;

FIG. 11 is a status transition diagram showing processing steps of the digital video cassette recording/reproducing apparatus.

BEST MODE FOR CARRYING OUT THE INVENTION

According to the first embodiment, in the case where a tape cassette which cannot correctly be displayed via the IRD like an analog-recorded program is reproduced, an alarm display is performed, thereby enabling the user to properly switch video inputs.

According to the second embodiment, in case of reproducing a tape cassette, by displaying a recording system, a recording time, program information, and the like of each program recorded in the tape cassette, whether a program which the user wants to reproduce and monitor has been analog-recorded or digitally recorded, which television broadcasting signal has been recorded, further, program contents, and the like can be discriminated, and further, the user is promoted to properly switch the video inputs in order to reproduce and monitor a desired program.

A construction of a system which is common to the first and second embodiments will be first explained in detail hereinbelow.

Figure 1:
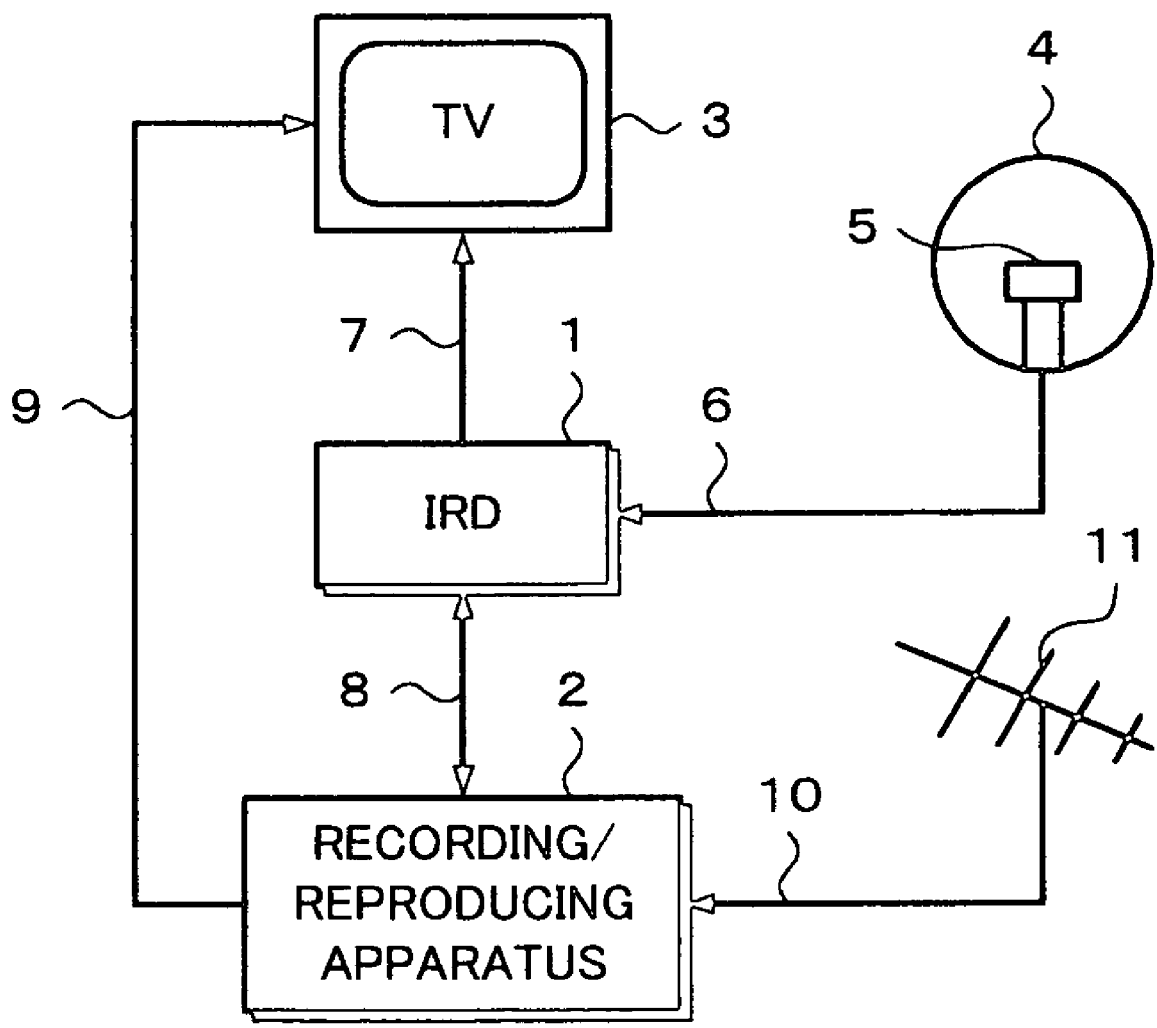
FIG. 1 is a block diagram of an example of a receiving and recording/reproducing system of a digital satellite broadcasting to which the invention is applied.

In FIG. 1, reference numeral 1 denotes an IRD; 2 a digital video cassette recording/reproducing apparatus; and 3 a television receiver. A receiving and recording/reproducing system of a digital satellite broadcasting is constructed by the IRD 1, digital video cassette recording/reproducing apparatus 2; and television receiver 3. Each of the IRD 1 and digital video cassette recording/reproducing apparatus 2 has an interface of IEEE1394. The IRD 1 and digital video cassette recording/reproducing apparatus 2 are connected via a cable 8 of the interface of IEEE1394.

The IRD 1 decodes a reception signal of a digital satellite broadcasting and forms a video signal and an audio signal of, for example, the NTSC system. An antenna terminal of the IRD 1 is connected to a low noise converter 5 attached to a parabolic antenna 4 via a cable 6. A radio wave from a satellite is transmitted by a band of, for example, 12 GHz. The radio wave from the satellite is received by the parabolic antenna 4 and converted into a signal of a band of, for example, 1 GHz by the low noise converter 5 attached to the parabolic antenna 4.

An output of the low noise converter 5 is supplied to the antenna terminal of the IRD 1 via the cable 6. In the IRD 1, a signal of a desired carrier wave is selected from the reception signal and a transport stream of MPEG2 is demodulated. A video packet and an audio packet of a desired program are extracted from the transport stream. A decoding process of the video packet and audio packet is performed. For example, the video signal and audio signal of the NTSC system are decoded.

A video output terminal and an audio output terminal of the IRD 1 are connected to a video input terminal and an audio input terminal of the television receiver 3 via a cable 7. The video signal and audio signal decoded by the IRD 1 are supplied to the video input terminal and audio input terminal of the television receiver 3. A reception picture plane of a desired program is displayed on the television receiver 3 and its audio sound is generated therefrom.

The digital video cassette recording/reproducing apparatus 2 can perform a digital recording and an analog recording in the same tape cassette. The IRD 1 and digital video cassette recording/reproducing apparatus 2 are connected via the cable 8 of the interface of IEEE1394.

A video output terminal and an audio output terminal of the digital video cassette recording/reproducing apparatus 2 are connected to the video input terminal and an audio input terminal of the television receiver 3 via a cable 9. An antenna terminal of the digital video cassette recording/reproducing apparatus 2 is connected to a ground wave antenna 11 via a cable 10.

In this system, the transport stream of MPEG2 based on the reception output of the digital satellite broadcasting received by the IRD 1 can be recorded/reproduced by the digital video cassette recording/reproducing apparatus 2. The recording system at this time differs depending on the kind of IRD and either a single program system or a multiprogram system is used.

In the case where the IRD of the single program system is connected, a transport stream of one program is extracted by the IRD from a plurality of multiplexed transport streams. The extracted transport stream is transmitted to the digital video cassette recording/reproducing apparatus 2 via the interface of IEEE1394 and recorded. In the case where the IRD of the multiprogram system is connected, a plurality of multiplexed transport streams are transmitted from the IRD to the digital video cassette recording/reproducing apparatus via the interface of IEEE1394 and recorded as they are. The digital video cassette recording/reproducing apparatus merely records the transport stream transmitted via the interface of IEEE1394 as it is. Processes upon recording at the time when the multiplexed transport streams are transmitted from the IRD of the multiprogram system and those at the time when one transport stream is transmitted from the IRD of the single program system are not very different.

The digital video cassette recording/reproducing apparatus 2 processes the signal of the ground wave broadcasting in an analogwise manner and can analog-record it to the loaded tape cassette.

In case of analog-processing the signal of the ground wave broadcasting and recording it to the tape cassette, the signal of the ground wave broadcasting is received by the antenna 11 and this reception signal is supplied to a ground wave tuner circuit in the digital video cassette recording/reproducing apparatus 2. By the ground wave tuner circuit, a signal of a desired channel is selected and an analog video signal and an analog audio signal are demodulated from the reception signal. The analog video signal and analog audio signal are analog-recorded to the tape cassette loaded in the digital video cassette recording/reproducing apparatus 2.

In case of reproducing the video cassette in which the video signal and audio signal have been analog-recorded, this video cassette is loaded into the digital video cassette recording/reproducing apparatus 2 and reproduced. By the digital video cassette recording/reproducing apparatus 2, the reproduction signal is sent to the television receiver 3 via the cable 9, a reception picture plane based on the analog signal reproduced from the tape cassette is displayed on the television receiver 3, and its audio sound is generated therefrom. Similarly, the digital video cassette recording/reproducing apparatus 2 can also input an analog video signal and an analog audio signal from an analog apparatus such as an 8-mm VTR or the like and record them to the loaded tape cassette in an analogwise manner.

Figure 2:
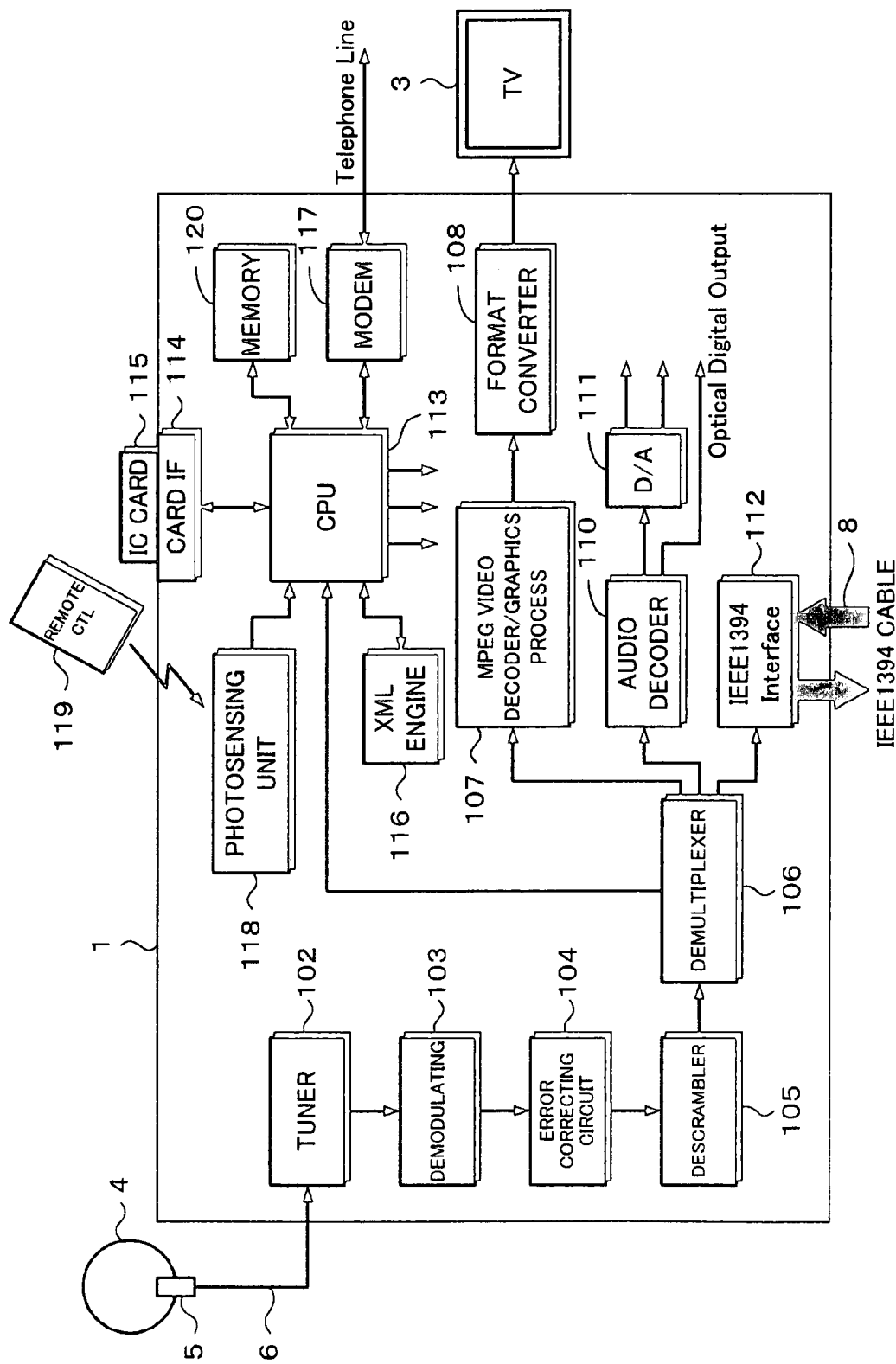
FIG. 2 is a block diagram of an example of an IRD in the receiving and recording/reproducing system of the digital satellite broadcasting to which the invention is applied.

FIG. 2 shows a construction of the IRD 1. As shown in FIG. 1, the radio wave of the digital satellite broadcasting which is transmitted by the radio wave of a band of, for example, 12 GHz via a satellite is received by the parabolic antenna 4 and converted into the signal of a band of 1 GHz by the low noise converter 5 attached to the parabolic antenna 4. An output of the low noise converter 5 is supplied to a tuner circuit 102 of the IRD 1 via the cable 6.

The tuner circuit 102 selects a signal of a predetermined carrier frequency from the reception signal on the basis of a control signal from a CPU (Central Processing Unit) 113 for controlling. A memory 120 is provided for the CPU 113. The selected signal of the carrier frequency is supplied to a demodulating circuit 103. For example, a QPSK (Quadrature Phase Shift Keying) demodulating process is executed in the demodulating circuit 103. The demodulated signal is supplied to an error correction processing circuit 104. A process such as Reed Solomon decoding or Viterbi decoding is performed in the error correction processing circuit 104.

An output of the error correction processing circuit 104 is supplied to a descrambler 105. Received ECM (Entitlement Control Message) data and EMM (Entitlement Management Message) data are inputted to the descrambler 105. Key data for descrambling stored in an IC card 115 loaded in an IC card slot 114 is also supplied to the descrambler 105. The descrambler 105 descrambles the MPEG transport stream by using the received ECM data and EMM data and the key data of the IC card 115. The descrambled transport stream of MPEG2 is sent to a demultiplexer 106.

The demultiplexer 106 separates a desired packet from the stream from the descrambler 105 on the basis of a command from the CPU 113. In the transmission packet, a packet identifier (PID) is provided in a header portion. A video packet and an audio packet of the desired program are extracted by the demultiplexer 106 on the basis of the PID. The video packet of the desired program is sent to an MPEG2 video decoder 107 and the audio packet is sent to an MPEG audio decoder 110.

The MPEG2 video decoder 107 receives the packet of the video signal from the demultiplexer 106, performs a decoding process of the MPEG2 system, and forms video data. The video data is supplied to a format converter 108. In the format converter 108, a digital video signal which is outputted from the MPEG video decoder is converted into an analog video signal of, for example, the NTSC system.

An output of the format converter 108 is supplied to the television receiver 3 via an analog video output terminal (not shown).

The MPEG audio decoder 110 receives the audio packet from the demultiplexer 106, executes an audio decoding process of the MPEG system, and forms the audio data before the data compression. The decoded audio data is converted into the analog audio signal by a D/A converter 111 and, thereafter, the analog audio signal is supplied to the television receiver 3 via an analog audio output terminal (not shown).

EPG data and XML data in the packet stream are separated by the demultiplexer 106 and sent to the CPU 113. An XML engine 116 is provided for the CPU 113.

An operation instruction for the IRD 1 is given by a remote controller 119. A remote control signal from the remote controller 119 is received by a photosensing unit 118 and supplied to the CPU 113. A modem 117 is provided and charging information is sent to a broadcasting station or a charging center by the modem 117 through a telephone line.

A carrier frequency of the reception signal is set on the basis of a channel setting signal inputted by a viewer. When setting to the desired program, a receiving frequency of the tuner circuit 102 is set to a predetermined carrier frequency by referring to an NIT (Network Information Table). The packet of the PID of a PMT (Program Map Table) as information regarding a desired channel is extracted with reference to a PAT (Program Association Table) as information regarding the channel at this carrier frequency. By referring to the PMT, PIDs of the packets of video, audio, and additional data of the desired channel are obtained.

An interface 112 of IEEE1394 is provided for the IRD 1. The transport stream can be inputted/outputted between the demultiplexer 106 and the interface 112 of IEEE1394. In case of the IRD 1 corresponding to the single program system, the video packet and audio packet of the desired program are extracted by the demultiplexer 106. The transport stream of MPEG2 comprising the video packet and audio packet of the desired program is sent from the demultiplexer 106 toward the digital video cassette recording/reproducing apparatus 2 via the interface 112 of IEEE1394. In case of the IRD 1 corresponding to the multiprogram system, a plurality of multiplexed transport streams which are sent by one carrier frequency are transmitted toward the digital video cassette recording/reproducing apparatus 2 via the interface 112 of IEEE1394.

In the case where the transport stream (single program) of MPEG2 reproduced by the digital video cassette recording/reproducing apparatus 2 is decoded by the IRD 1 corresponding to the single program system, the transport stream of MPEG2 from the digital video cassette recording/reproducing apparatus 2 is inputted via the interface 112 of IEEE1394 and sent to the demultiplexer 106. The video packet and audio packet are separated from the transport stream of MPEG2 by the demultiplexer 106. The video packet is sent to the MPEG2 video decoder 107 and decoded. The audio packet is sent to the MPEG audio decoder 110 and decoded. A case where the transport stream (multiprogram) of MPEG2 reproduced by the digital video cassette recording/reproducing apparatus 2 is decoded by the IRD 1 corresponding to the single program system will be described hereinlater.

In the case where the transport stream (multiprogram) of MPEG2 reproduced by the digital video cassette recording/reproducing apparatus 2 is decoded by the IRD 1 corresponding to the multiprogram system, the transport stream of MPEG2 from the digital video cassette recording/reproducing apparatus 2 is inputted via the interface 112 of IEEE1394 and sent to the demultiplexer 106. The video packet and audio packet of the desired program are separated by the demultiplexer 106 on the basis of the control signal from the CPU 113. The video packet is sent to the MPEG2 video decoder 107 and decoded. The audio packet is sent to the MPEG audio decoder 110 and decoded.

In the case where the transport stream (single program) of MPEG2 reproduced by the digital video cassette recording/reproducing apparatus 2 is decoded by the IRD 1 corresponding to the multiprogram system, the transport stream of MPEG2 from the digital video cassette recording/reproducing apparatus 2 is inputted via the interface 112 of IEEE1394 and sent to the demultiplexer 106. The video packet and audio packet of the desired program are separated by the demultiplexer 106. The video packet is sent to the MPEG2 video decoder 107 and decoded. The audio packet is sent to the MPEG audio decoder 110 and decoded.

Figure 3:
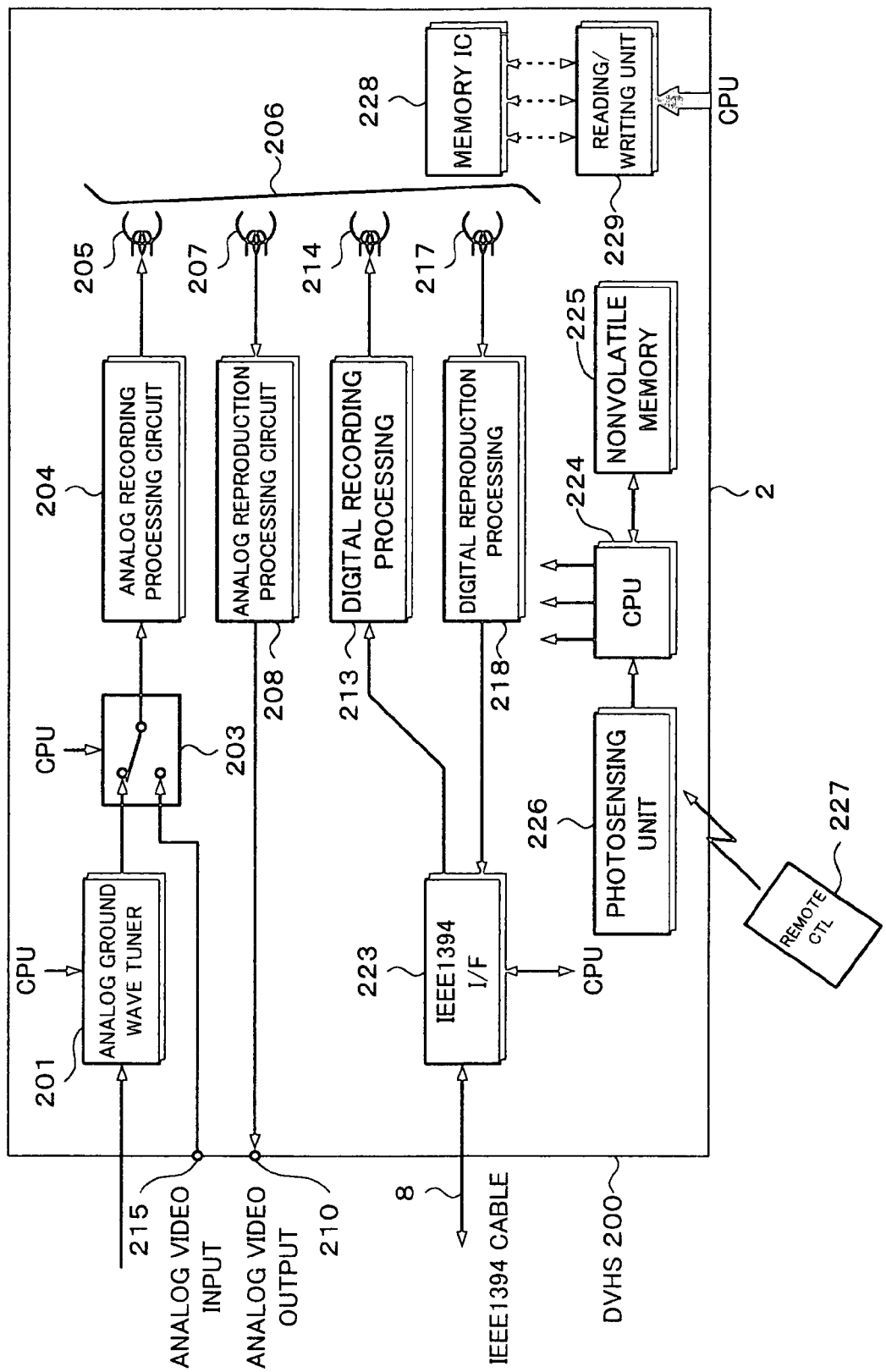
FIG. 3 is a block diagram of an example of a digital video cassette recording/reproducing apparatus in the receiving and recording/reproducing system of the digital satellite broadcasting to which the invention is applied.

FIG. 3 shows a construction of the digital video cassette recording/reproducing apparatus 2. The digital video cassette recording/reproducing apparatus 2 can perform the digital recording/reproduction and the analog recording/reproduction as mentioned above. A digital recording processing circuit 213 and a digital reproduction processing circuit 218 are provided in order to perform the digital recording/reproduction. An analog recording processing circuit 204 and an analog reproduction processing circuit 208 are provided in order to perform the analog recording/reproduction.

The whole control is performed by a CPU 224. An operation instruction for the digital video cassette recording/reproducing apparatus 2 is given by a remote controller 227. A remote control signal from the remote controller 227 is received by photosensing unit 226 and supplied to the CPU 224. A nonvolatile memory 225 is connected to the CPU 224.

In case of recording the transport stream from the IRD 1 (common to both single program system and multiprogram system), the transport stream of MPEG2 from the IRD 1 is inputted via an interface 223 of IEEE1394. The transport stream of MPEG2 is supplied to the digital recording processing circuit 213. An error correction encoding process and a recording modulating process are performed to the data of the transport stream by the digital recording processing circuit 213. An output of the digital recording processing circuit 213 is supplied to a head 214. Thus, the transport stream from the IRD 1 is recorded to a video tape 206 of the tape cassette loaded in the digital video cassette recording/reproducing apparatus 2.

In case of reproducing the tape cassette in which the transport stream (single program system) of MPEG2 has been recorded, a reproduction signal of the video tape 206 is reproduced by a head 217. An output of the head 217 is supplied to the digital reproduction processing circuit 218. A demodulating process and an error correcting process are executed by the digital reproduction processing circuit 218. An output of the digital reproduction processing circuit 218 is supplied to the interface 223 of IEEE1394. The reproduced transport stream is supplied to the IRD 1 via the cable 8 of IEEE1394.

A video packet and an audio packet are separated from the transport stream by the demultiplexer 106 (FIG. 2) of the IRD 1. The video packet is decompressed by the MPEG2 video decoder 107, converted into a video signal of the NTSC system by the format converter 108, and sent to the television receiver 3 from a video output terminal (not shown). The audio packet is decompressed by the MPEG audio decoder 110, converted into an analog signal by the D/A converter 111, and sent to the television receiver 3 from an audio output terminal (not shown). Processes in case of reproducing the tape cassette in which the transport stream (multiprogram system) of MPEG2 has been recorded will be described hereinlater.

In FIG. 3, in case of analog-recording the ground wave broadcasting, the signal received by the antenna 11 is supplied to a ground wave tuner circuit 201. The reception signal of a desired broadcasting is selected by the ground wave tuner circuit 201. The analog video signal and audio signal of, for example, the NTSC system are demodulated from the reception signal. The analog video signal and analog audio signal are supplied to the analog recording processing circuit 204 via a switching circuit 203. A recording process of the video signal and audio signal is performed by the analog recording processing circuit 204. That is, a luminance signal is frequency modulated, a chroma signal is converted into a low band frequency, and the audio signal is frequency modulated. Those signals are multiplexed and a resultant signal is supplied to a head 205. The analog video signal and audio signal are recorded by the head 205 onto the tape 206 in the loaded tape cassette.

Further, an analog video signal and an analog audio signal supplied from an analog apparatus (for example, 8-mm VTR) connected to the outside can be analog-recorded. An analog video signal and an analog audio signal supplied from an analog external input terminal 215 are sent to the analog recording processing circuit 204 via the switching circuit 203. A recording process of the video signal and audio signal is performed by the analog recording processing circuit 204. The subsequent processes are substantially the same as those in case of analog-recording the ground wave broadcasting mentioned above.

In case of reproducing the analog-recorded tape cassette, the signal on the tape 206 is reproduced by a head 207 and supplied to the analog reproduction processing circuit 208. A reproducing process of the video signal and audio signal of the NTSC system is performed by the analog reproduction processing circuit 208. That is, a frequency modulation luminance signal, a low band conversion chroma signal, and a frequency modulation audio signal are extracted from a reproduction signal. A frequency demodulating process is performed to the frequency modulation luminance signal, so that the luminance signal is demodulated. The low band conversion chroma signal is returned to a chroma signal of a carrier frequency of 3.58 MHz. The video signal of the NTSC system is formed from the luminance signal and the chroma signal. A frequency demodulating process is performed to the frequency modulation audio signal and the audio signal is demodulated. The video signal and audio signal are outputted from an analog output terminal 210.

The user can control various AV apparatuses connected to the IRD 1 via the interface of IEEE1394, for example, the digital video cassette recording/reproducing apparatus 2 by a control panel DISP2 (refer to FIG. 5) displayed on a monitor screen of the television receiver 3. For example, the cassette tape loaded in the digital video cassette recording/reproducing apparatus 2 can be reproduced by pressing a PLAY button on the control panel DISP2, and a desired program can be recorded onto the cassette tape by pressing a RECORD button.

The first embodiment will now be described.

In the system to which the invention is applied as mentioned above, the IRD 1 and digital video cassette recording/reproducing apparatus 2 are connected via the interface of IEEE1394. According to the interface of IEEE1394, the video data and audio data can be transmitted at a high speed in an isochronous transmitting mode and a command and a status signal are transmitted in an asynchronous transmitting mode. On the IRD 1 side, the operating status is set as shown in FIGS. 4A and 4B on the basis of the status signal sent from the digital video cassette recording/reproducing apparatus 2.

The operation in a status other than the reproduction will be first described. FIG. 4A shows the status other than the reproduction. As shown in FIG. 4A, in a status where an input/output is performed via IEEE1394 and when the control panel DISP2 (FIG. 5) is displayed, if the digital video cassette recording/reproducing apparatus 2 is in a stop mode, the reception picture plane of the digital satellite broadcasting and its audio sound are generated and a station of the digital satellite broadcasting can be selected. When the digital video cassette recording/reproducing apparatus 2 is in a recording pause mode, the reception picture plane of the digital satellite broadcasting and its audio sound are generated and a station of the digital satellite broadcasting can be selected. When the digital video cassette recording/reproducing apparatus 2 is in a recording mode, the reception picture plane of the digital satellite broadcasting and its audio sound are generated. Since the recording operation is being performed at this time, a station of the digital satellite broadcasting cannot be selected and, at the same time, a message of "During recording. Cannot be selected." is displayed.

When the control panel DISP2 is not displayed, if the digital video cassette recording/reproducing apparatus 2 is in a stop mode, the reception picture plane of the digital satellite broadcasting and its audio sound are generated and a station of the digital satellite broadcasting can be selected. When the digital video cassette recording/reproducing apparatus 2 is in a recording pause mode, the reception picture plane of the digital satellite broadcasting and its audio sound are generated and a station of the digital satellite broadcasting can be selected. When the digital video cassette recording/reproducing apparatus 2 is in a recording mode, the reception picture plane of the digital satellite broadcasting and its audio sound are generated. Since the recording operation is being performed at this time, a station of the digital satellite broadcasting cannot be selected and, at the same time, an alarm message of "During recording. Cannot be selected." is displayed.

Figure 6:
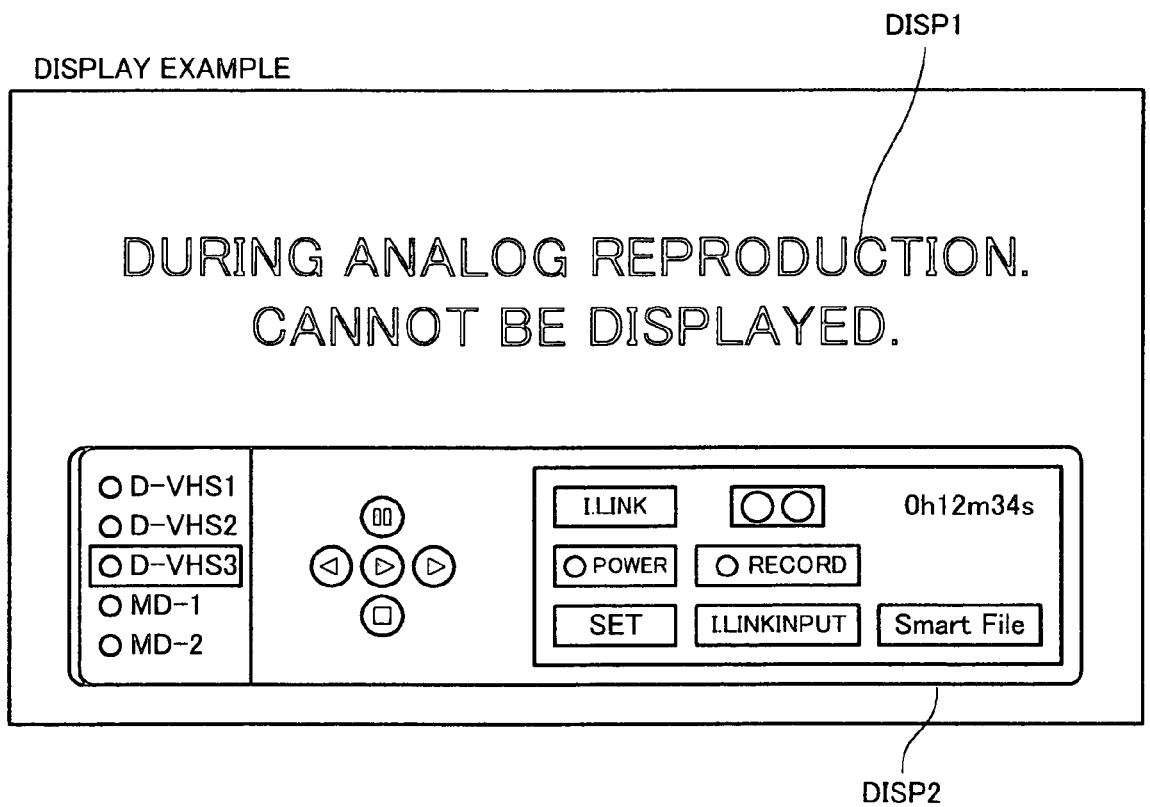
FIG. 6 is a schematic diagram showing an example of an alarm display.

In a status where the input/output is performed in an analogwise manner, when the control panel DISP2 is displayed, if the digital video cassette recording/reproducing apparatus 2 is in a stop mode, the picture plane is muted as a gray screen and the audio sound is muted. As shown in FIG. 6, an alarm showing "During analog reproduction. Cannot be displayed." is displayed. At this time, a station of the digital satellite broadcasting cannot be selected. When the digital video cassette recording/reproducing apparatus 2 is in a recording pause mode, the picture plane is muted as a gray screen and the audio sound is muted. As shown in FIG. 6, an alarm DISP1 showing "During analog reproduction. Cannot be displayed." is displayed. At this time, a station of the digital satellite broadcasting cannot be selected. When the digital video cassette recording/reproducing apparatus 2 is in a recording mode, the picture plane is muted as a gray screen and the audio sound is muted. As shown in FIG. 6, an alarm DISP1 showing "During analog reproduction. Cannot be displayed." is displayed. At this time, a station of the digital satellite broadcasting cannot be selected.

When the control panel DISP2 is not displayed, if the digital video cassette recording/reproducing apparatus 2 is in a stop mode, the reception picture plane of the digital satellite broadcasting and its audio sound are generated and a station of the digital satellite broadcasting can be selected. When the digital video cassette recording/reproducing apparatus 2 is in a recording pause mode, the reception picture plane of the digital satellite broadcasting and its audio sound are generated and a station of the digital satellite broadcasting can be selected. When the digital video cassette recording/reproducing apparatus 2 is in a recording mode, the reception picture plane of the digital satellite broadcasting and its audio sound are generated and a station of the digital satellite broadcasting can be selected.

As mentioned above, the reason why the picture plane and the audio sound are muted when the control panel DISP2 is displayed in a state where the process is performed in an analogwise manner is to prevent the operation of the control panel DISP2 by an erroneous recognition of the user.

That is, if the reception picture plane of the digital satellite broadcasting and the control panel DISP2 are simultaneously displayed, the apparatus can be set to the recording mode in order to record the displayed picture plane by the control panel DISP2. However, in the analog input, the transport stream of the digital satellite cannot be recorded. If the apparatus is set to the recording mode in an analog state by the control panel DISP2, the reception picture plane or the like of the ground wave tuner circuit 201 is analog-recorded. As mentioned above, if the reception picture plane of the digital satellite broadcasting and the control panel DISP2 are simultaneously displayed, there is such a possibility that the apparatus is set to the recording mode by the control panel DISP2 in order to record the reception picture plane. In this instance, even if the apparatus is set to the recording mode, the reception picture plane of the digital satellite broadcasting cannot be recorded as expected by the user. To prevent such a recording due to the erroneous recognition of the user, in a state where the process is performed in an analogwise manner, the picture plane and the audio sound are muted when the control panel DISP2 is displayed.

On the other hand, when the control panel DISP2 is not displayed, the apparatus cannot be set to the recording mode by the control panel DISP2. Therefore, even if the reception picture plane of the digital satellite broadcasting is displayed, while the user watches the reception picture plane, he does not record the received broadcasting by the control panel DISP2. On the other hand, if the picture plane and the audio sound have been muted at this time, the user becomes confused because the reception picture plane cannot be seen. Therefore, even in case of the analog input/output, when the control panel DISP2 is not displayed, the reception picture plane of the digital broadcasting is displayed on the reception picture plane.

The reproducing mode will now be described. FIG. 4B shows the contents in the reproducing mode. In the reproducing mode, if the reproduction is digitally performed, when the control panel DISP2 is displayed, the reproduction picture plane is displayed and the reproduction sound is outputted. At this time, a station cannot be selected. Even when the control panel DISP2 is not displayed, similarly, in the reproducing mode, the reproduction picture plane is displayed, the reproduction sound is generated, and a station cannot be selected.

When the reproduction is performed in an analogwise manner, the picture plane is muted as a gray screen and the audio sound is muted. As shown in FIG. 6, an alarm DISP1 showing "During analog reproduction. Cannot be displayed." is displayed. At this time, a station of the digital satellite broadcasting cannot be selected. Even when the control panel DISP2 is not displayed as well, similarly, the picture plane is muted as a gray screen and the audio sound is muted. As shown in FIG. 6, an alarm DISP1 showing "During analog reproduction. Cannot be displayed." is displayed. At this time, a station of the digital satellite broadcasting cannot be selected.

As mentioned above, in a status where the analog input/output is performed, when the control panel DISP2 is displayed, in the reproducing mode, the picture plane and the audio sound are muted and an alarm DISP1 showing "During analog reproduction. Cannot be displayed." is displayed. Since the signal is digitally transmitted between the digital video cassette recording/reproducing apparatus 2 and IRD 1, if the analog-recorded tape cassette is loaded into the digital video cassette recording/reproducing apparatus 2 and the analog reproduction is performed, the reproduction signal from the digital video cassette recording/reproducing apparatus 2 is not sent to the IRD 1 and the reproduction picture plane cannot be displayed on the reproduction picture plane of the television receiver 3 via the IRD 1. In such a case, the picture plane and the audio sound are muted and an alarm DISP1 showing "During analog reproduction. Cannot be displayed." is displayed.

As mentioned above, if the analog-recorded tape cassette is loaded into the digital video cassette recording/reproducing apparatus 2 and the analog reproduction is performed, the alarm showing "During analog reproduction. Cannot be displayed." is displayed. Thus, the user can correctly recognize the causes by which the reproduction picture plane cannot be displayed. That is, the user can recognize that it is necessary to switch the channel to a channel (Video 1, Video 2, etc.) which is being analog-reproduced in order to see the reproduction picture plane.

There is such a possibility that the analog-recorded tape cassette is loaded into the digital video cassette recording/reproducing apparatus 2 as mentioned above. Further, there is a case where a transport stream of another digital satellite broadcasting service is reproduced or a case where a tape cassette in which the digital video signal has been recorded by a different system is reproduced. Therefore, in the case where the tape cassette in which the transport stream of another digital satellite broadcasting service has been recorded is reproduced or in the case where the transport stream of a different system is reproduced, an alarm showing "Different system. Cannot be displayed." can be displayed.

Although the case where the transport stream of MPEG2 from the IRD 1 is recorded/reproduced by the digital video cassette recording/reproducing apparatus 2 has been mentioned in the embodiment, the transport stream of MPEG2 from the IRD 1 can be also recorded/reproduced by a recording/reproducing apparatus such as DVD, CD-R, hard disk, or the like.

The second embodiment will now be described.

In the digital video cassette recording/reproducing apparatus 2, while the digital recording process by which the transport stream which is sent from the IRD 1 to the digital video cassette recording/reproducing apparatus 2 via the IEEE1394 cable 8 is recorded to the video tape or the analog recording process by which the analog video signal and audio signal which are sent from the IRD 1 to the digital video cassette recording/reproducing apparatus 2 via the analog external input terminal 215 is recorded to the video tape 206 is being executed, the CPU 113 of the IRD 1 makes a writing preparation for writing program recording information such as title, channel number, date and time, and the like of a recording program into a memory IC 228 as memory means adhered to a backbone portion of a video cassette.

In this case, a video stream is fetched from the interface 112 of IEEE1394 by the CPU 113 as program recording information forming means. An EPG (Electric Program Guide) stream comprising packets in which an EPG has been recorded in the video stream is temporarily held in the memory 120. From the memory 120, program associated data serving as program associated information such as channel number, title, genre, name of the broadcasting service enterprise, and the like which need to be displayed in a smart file is extracted from the EPG stream.

In the case where the analog recording is performed by the operation of the remote controller 119 of the user, "normal" or "3 times" is selected as a recording speed. In the case where the digital recording is performed, "digital" is selected. In this instance, the CPU 113 obtains recording system information which is expressed by "normal" or "3 times" that is generated when the program data has been analog-recorded to the video tape 206 by the digital video cassette recording/reproducing apparatus 2 or is expressed by "digital" that is generated when the program data has been digitally recorded to the video tape 206 and recording conditions such as date and time, day of the week, recording time, and the like from the CPU 224 of the digital video cassette recording/reproducing apparatus 2 via the IEEE1394 cable 8. Program recording information is formed in the memory 120 on the basis of the program associated data and recording conditions.

By the CPU 113, the program recording information is sent to the CPU 224 of the digital video cassette recording/reproducing apparatus 2 from the interface 112 of IEEE1394 by the asynchronous communicating system via the IEEE1394 cable 8 and the interface 223 of IEEE1394. The program recording information is transmitted to a data reading/writing unit 229 by the CPU 224 on the basis of recording control data.

The data reading/writing unit 229 has a coil antenna (not shown), generates a fluctuation magnetic field according to the program recording information through the coil antenna, and supplies it to a coil-shaped antenna wiring (not shown) adhered to the backbone of the video cassette, thereby enabling the program recording information to be written into the memory IC 228 connected to the antenna wiring.

In the digital video cassette recording/reproducing apparatus 2, consequently, when the recording process to the video tape 206 is finished by the CPU 224 of the IRD 1, the program recording information regarding the recording program is promptly written into the memory IC 228 of the video cassette.

Figure 7:
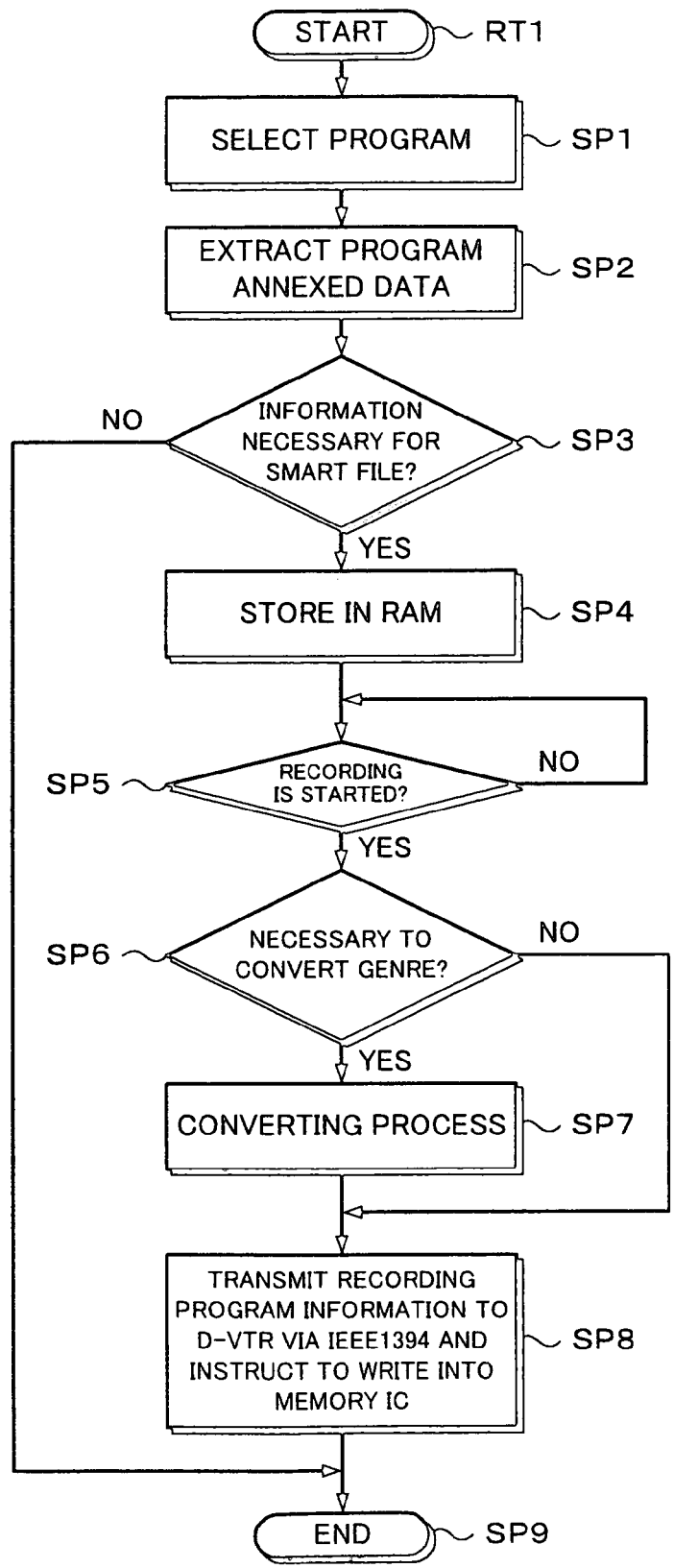
FIG. 7 is a flowchart showing a writing processing procedure of program recording information.

A writing processing procedure in a range from the timing when the program recording information has been transmitted to the digital video cassette recording/reproducing apparatus 2 to the timing when it is written into the memory IC 228 of the video cassette on the basis of the control of the CPU 113 of the IRD 1 will now be described with reference to a flowchart of FIG. 7. The CPU 113 starts the processes from a starting step RT1 and enters step SP1. In step SP1, the CPU 113 selects the program designated by the remote controller 119 and advances to next step SP2.

In step SP2, the CPU 113 extracts the program associated data such as channel number, title, genre, name of the broadcasting service enterprise, and the like which need to be displayed in the smart file from the EPG stream in the selected program data and enters next step SP3.

In step SP3, the CPU 113 discriminates whether the extracted program associated data is the information necessary for the smart file or not. If NO, this means that the extracted program associated data is not the necessary information to be displayed in the smart file. At this time, since there is no need to write the program associated data into the memory IC 228, the CPU 113 advances to step SP9 and finishes the processes.

On the other hand, if YES in step SP3, this means that the extracted program associated data is the necessary information to be displayed in the smart file. At this time, the CPU 113 advances to next step SP4. In step SP4, the CPU 113 temporarily holds the program associated data into the memory 120 and advances to next step SP5.

In step SP5, the CPU 113 discriminates whether the recording process for the video tape 206 has been started or not. If NO, this means that the recording process for the video tape 206 is not started yet. At this time, the CPU 113 repeats the above discriminating process until the recording process is started.

On the other hand, if YES in step SP5, this means that the recording process for the video tape 206 has already been started. At this time, it is necessary to promptly make the writing preparation for recording the program recording information into the memory IC 228 at a point when the recording process for the video tape 206 is finished. Next step SP6 follows.

The name of the genre of the program associated data added to the program data sent from the broadcasting service enterprise via the communication satellite and the name of the genre to be displayed in the smart file in the digital video cassette recording/reproducing apparatus 2 do not always correspond to each other in a one-to-one relationship manner. For example, as shown in FIG. 8, when the name of the genre in the digital video cassette recording/reproducing apparatus 2 is "news", the name of the genre in the broadcasting enterprise is "news/report".

In step SP6, therefore, the CPU 113 discriminates whether it is necessary to change the name of the genre before the program recording information held in the memory 120 is recorded to the video tape 206 by the digital video cassette recording/reproducing apparatus 2 or not on the basis of a genre correspondence table (FIG. 8) stored in the memory 120.

If NO in step SP6, this means that the name of the genre in the broadcasting enterprise and the name of the genre at the time when it is displayed in the smart file by the digital video cassette recording/reproducing apparatus 2 accidentally coincide with each other and there is no need to convert the name of the genre. At this time, the CPU 113 advances to step SP8.

On the other hand, if YES in step SP6, this means that the name of the genre in the broadcasting enterprise and the name of the genre in the digital video cassette recording/reproducing apparatus 2 do not correspond to each other in a one-to-one relationship manner, and it is necessary to convert the name of the genre when the data is recorded to the video tape 206. At this time, the CPU 113 advances to next step SP7.

In step SP7, the CPU 113 converts the name of the genre that is sent from the broadcasting enterprise into the name of the genre in the digital video cassette recording/reproducing apparatus 2 on the basis of the genre correspondence table. The recording system information of the recording mode of "normal" or "3 times" (analog recording) or "digital" (digital recording) designated by the user and the recording conditions comprising the date and time, the day of the week, the recording time, and the like are obtained from the CPU 224 of the digital video cassette recording/reproducing apparatus 2 via the IEEE1394 cable 8. After that, the program recording information is formed on the basis of the recording conditions and the program associated data whose genre was converted. Next step SP8 follows.

In step SP8, the CPU 113 transmits the recording control data for writing the program recording information into the memory IC 228 and the program recording information to the CPU 224 of the digital video cassette recording/reproducing apparatus 2 via the interface 112 of IEEE1394, IEEE1394 cable 8, and interface 223 of IEEE1394, thereby instructing the CPU 224 to write the program recording information into the memory IC 228. The writing processing procedure RT1 is finished in next step SP9.

Subsequently, an editing processing procedure in a range from the timing when the program recording information once written in the memory IC 228 is edited in accordance with a request of the user to the timing when it is written again in the memory IC 228 on the basis of the control of the CPU 113 of the IRD 1 will be described with reference to a flowchart of FIG. 9. The CPU 113 starts the processes from a starting step RT2 and advances to step SP11.

In step SP11, the CPU 113 controls the CPU 224 of the digital video cassette recording/reproducing apparatus 2 in such a manner that the program recording information which has already been written as data to be displayed in the smart file is read out from the memory IC 228 by the data reading/writing unit 229. The CPU 113 receives it via the interface 223 of IEEE1394, IEEE1394 cable 8, and interface 112 of IEEE1394. Next step SP12 follows.

In step SP12, the CPU 113 discriminates whether the name of the genre in the digital video cassette recording/reproducing apparatus 2 and the name of the genre in the broadcasting enterprise do not correspond to each other in a one-to-one relationship manner and it is necessary to reversely convert and once return the name of the genre in the digital video cassette recording/reproducing apparatus 2 into the name of the genre of the broadcasting service enterprise or not.

If NO, this means that the genre which needs to be reversely converted does not exist. In this instance, the CPU 113 advances to step SP14. If YES in step SP12, on the other hand, this means that the genre which needs to be reversely converted exists. In this instance, the CPU 113 advances to step SP13.

In step SP13, the CPU 113 reversely converts the name of the genre and sets the apparatus into a state where the program recording information can be edited. Next step SP14 follows.

In step SP14, the CPU 113 holds the program recording information in the editable state into the memory 120 and advances to next step SP15.

In step SP15, the CPU 113 discriminates whether an edition instructing command has been issued by the operation of the remote controller 119 of the user or not. If NO, this means that the edition instructing command is not issued. At this time, the CPU 113 continuously waits until the edition instructing command is issued.

If YES in step SP15, this means that the edition instructing command has been issued. In this instance, the CPU 113 advances to step SP16 and executes an editing process such as a change of the title or the like on the basis of the operation of the remote controller 119 of the user. Next step SP17 follows.

In step SP17, the CPU 113 discriminates whether the name of the genre in the program recording information whose editing process is over and which has been held in the memory 120 needs to be again converted into the name of the genre at the time of displaying it in the smart file or not. If NO, the CPU 113 advances to step SP19 without executing the converting process.

If YES in step SP17 on the other hand, the CPU 113 advances to next step SP18 and converts the name of the genre into the name adapted to be displayed in the smart file. Next step SP19 follows.

In step SP19, the CPU 113 transmits the recording control data for writing the program recording information whose editing process is over into the memory IC 228 and the program recording information whose editing process is over to the CPU 224 of the digital video cassette recording/reproducing apparatus 2 through the interface 112 of IEEE1394, the IEEE1394 cable 8, and the interface 223 of IEEE1394, thereby instructing the CPU 224 of the digital video cassette recording/reproducing apparatus 2 to write the edited program recording information. The writing processing procedure RT2 is finished in next step SP20.

The case where the program recording information written in the memory IC 228 is read out and displayed on the television receiver 3 by the foregoing procedure will now be described. When an instruction to display the program recording information of the video cassette loaded in the digital video cassette recording/reproducing apparatus 2 is issued by the user via the control panel DISP2 or the like (for example, a "Smart File" button in the control panel DISP2 is pressed), the CPU 113 of the IRD1 first allows the CPU 224 to read out the program recording information from the memory IC 228 via the reading/writing unit 229 and receives the read-out program recording information through the IEEE1394 cable 8.

The CPU 113 of the IRD 1 transmits the program recording information to the MPEG2 video decoder 107 from the interface 112 of IEEE1394. The MPEG2 video decoder 107 forms smart file image data by performing a graphics process to the program recording information and transmits it to the format converter 108.

Figure 10:
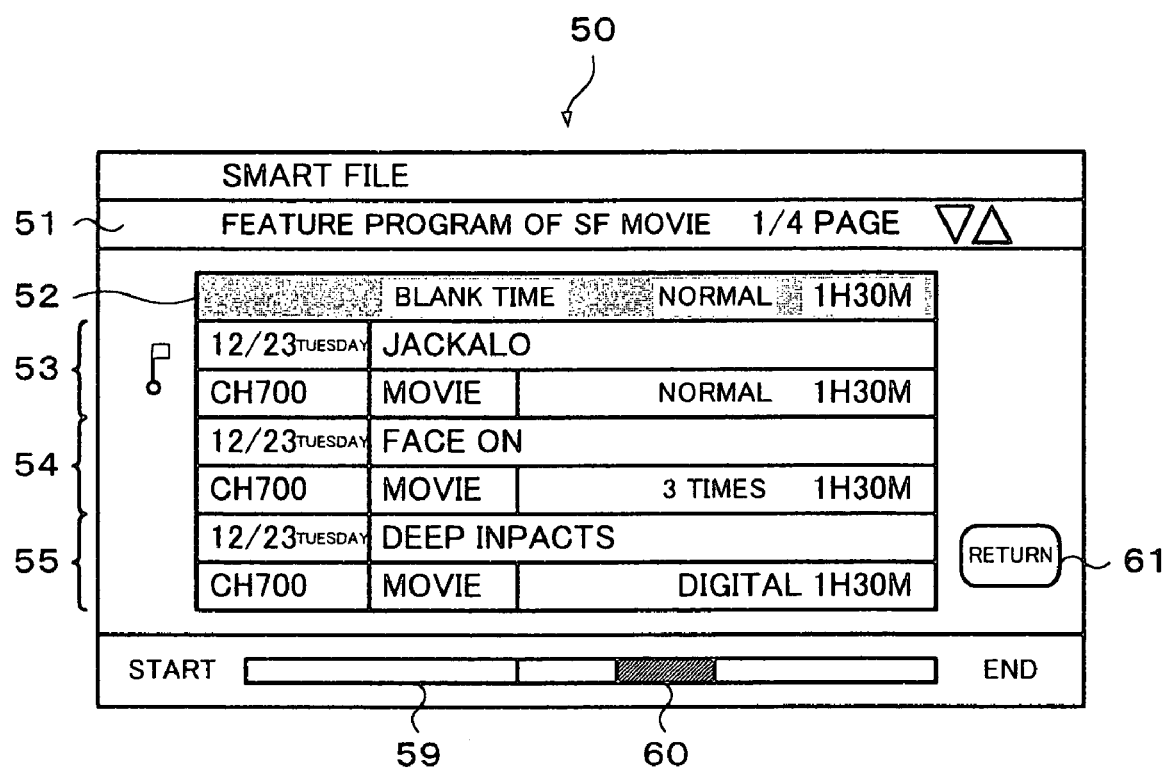
FIG. 10 is a schematic diagram showing a smart file picture plane.

The format converter 108 converts the smart file image data into the luminance signal and color difference signals of the NTSC system, converts them into analog signals, and forms a smart file image signal. This signal is displayed on the television receiver 3 as a smart file picture plane 50 as a program recording information display picture plane as shown in FIG. 10.

In the reproducing mode in which the video tape 206 on which the program data has been recorded is reproduced by the digital video cassette recording/reproducing apparatus 2, in the case where an instruction to display the program recording information of the video cassette loaded in the digital video cassette recording/reproducing apparatus 2 is issued by the user via the control panel DISP2 or the like, the smart file picture plane 50 read out from the memory IC 228 of the video cassette can be also overlaid to a reproduction video image and displayed on the television receiver 3.

The smart file picture plane 50 is constructed by four pages in total. A title "Feature program of SF movie" of a video cassette is displayed in a title display region 51 of ¼ page which is displayed at present. In the case where the program data has been recorded by the analog system of the "normal" speed, a message indicating that a blank time of 1 hour 30 minutes remains is displayed in a display region 52.

On the smart file picture plane 50, in a program information display region 53, "12/23 Tuesday" is displayed as a date and time and the day of the week, "CH700" is displayed as a channel number, "Jackalo" is displayed as a title, "Movie" is displayed as a genre, "Normal" of the analog system is displayed as a recording speed, and "1H30M (1 hour 30 minutes)" is displayed as a recording time.

In a program information display region 54, "12/23 Tuesday" is displayed as date and time and the day of the week, "CH700" is displayed as a channel number, "Face on" is displayed as a title, "Movie" is displayed as a genre, "3 times" of the analog system is displayed as a recording speed, and "1H30M" is displayed as a recording time.

In a program information display region 55, "12/23 Tuesday" is displayed as date and time and the day of the week, "CH700" is displayed as a channel number, "Deep impacts" is displayed as a title, "Movie" is displayed as a genre, "digital" of the digital system is displayed as a recording speed, and "1H30M" is displayed as a recording time.

On the smart file picture plane 50, a bar display 59 is performed at the lowest stage, and at which position in a range from the start to the end of the video tape 206 the blank time portion 60 is located is displayed in a different color, thereby enabling the user to easily recognize the position of the blank time portion 60. When the program information display region 55 of "Deep impacts" is selected, the portion where the program of "Deep impacts" has been recorded is displayed in a different color so that it is possible to easily find at which position in the range from the start to the end of the video tape 206 such a recorded portion exists.

On the smart file picture plane 50, an information display region corresponding to the current position of the video tape 206 is displayed in a different color. For example, when the current position of the video tape 206 is located in the middle of the program of "Deep impacts", the program information display region 55 corresponding to "Deep impacts" is displayed in a different color. Thus, the user can easily recognize the current position of the video tape 206.

The smart file picture plane 50 can be also read out by the operation of the remote controller 119 (FIG. 2) by the user during the reproduction of the program and displayed in a state where it has been overlaid onto the program video image on the television receiver 3. When a RETURN button 61 is selected, the picture plane 50 is returned to the program video image which is being reproduced.

By referring to the smart file picture plane 50, the user can confirm the recording date and time of the program to be monitored from now on, the genre, the title name, the recording time, and the analog/digital recording system information at a glance.

In the case where the user refers to the smart file picture plane 50 and designates, for example, the program information display region 55 by the operation of the remote controller 119, the CPU 113 of the IRD 1 controls the digital video cassette recording/reproducing apparatus 2, searches the selected program "Deep impacts", and reproduces it from the head portion.

Subsequently, in the digital video cassette recording/reproducing apparatus 2, a processing step in which the program recording information that is displayed in the smart file when the program data is recorded onto the video tape 206 is written into the memory IC 228 of the video cassette and a processing step until the smart file picture plane 50 read out from the memory IC 228 of the video cassette is overlaid onto the reproduction video image and a resultant video image is displayed on the television receiver 3 when the video tape 206 is reproduced will now be described by using FIG. 11.

In the IRD 1, after the program data was first received in step SP21, the program recording information to be displayed in the smart file is formed and transmitted to the digital video cassette recording/reproducing apparatus 2 via the IEEE1394 cable 8 in step SP22, and the transport stream is transmitted to the digital video cassette recording/reproducing apparatus 2 via the IEEE1394 cable 8 in step SP23.

In the digital video cassette recording/reproducing apparatus 2, in step SP24, the CPU 224 analyzes recording control data D in order to write the program recording information into the memory IC 228 of the video cassette, sends the program recording information to the data reading/writing unit 229, and makes the writing preparation. In step SP25, the digital recording processing circuit 213 performs an error correction encoding process to the transport stream and records the processed transport stream to the video tape 206. In the digital video cassette recording/reproducing apparatus 2, in step SP26, the CPU 224 writes the program recording information into the memory IC 228 of the video cassette.

Subsequently, in the digital video cassette recording/reproducing apparatus 2, in step SP27, the CPU 224 reads out the program recording information from the memory IC 228 of the video cassette and returns it to the IRD 1 via the IEEE1394 cable 8. In step SP28, the video tape 206 is reproduced and the CPU 224 performs an error correction decoding process to the transport stream reproduced by the digital reproduction processing circuit 218 and sends the processed transport stream to the IRD 1 via the IEEE1394 cable 8.

Subsequently, in the IRD 1, in step SP29, the program recording information is sent to the MPEG2 video decoder 107 and a graphics process is performed to the program recording information, thereby forming the smart file image data, and an MPEG decoding process is performed to the reproduction transport stream, thereby reconstructing the reproduction video data. In step SP33, the smart file image data and the reproduction video data are synthesized. After that, in step SP34, the synthesized data is converted into the data of the NTSC system and the resultant smart file picture plane 50 in a state where it has been overlaid onto the reproduction video image is displayed on the television receiver 3. The processing routine is finished.

In the above construction, according to the digital video cassette recording/reproducing apparatus 2, while the program data selected on the basis of the control of the CPU 113 of the IRD 1 is being recorded to the video tape 206 via the digital video cassette recording/reproducing apparatus 2, the program associated data necessary to be displayed in the smart file is extracted from the electric program guide stream by the CPU 113. At the same time, the recording system information which is expressed by "normal", "3 times", or "digital" and the recording conditions comprising the date and time, the day of the week, the recording time, and the like are obtained from the CPU 224 of the digital video cassette recording/reproducing apparatus 2. The program recording information is formed on the basis of the program associated data and the recording conditions and the writing preparation is made.

The digital video cassette recording/reproducing apparatus 2 transmits the program recording information to the CPU 224 of the digital video cassette recording/reproducing apparatus 2 via the IEEE1394 cable 8 on the basis of the control of the CPU 113 of the IRD 1. When the recording process for recording the program data to the video tape 206 is finished, the program recording information is automatically written into the memory IC 228 of the video cassette.

Subsequently, in the case where the video tape 206 on which the program data has been recorded is reproduced or in the case where the user selects a smart file mode from the control panel DISP2 as shown in the diagram, the digital video cassette recording/reproducing apparatus 2 reads out the program recording information from the memory IC 228 of the video cassette on the basis of the control of the CPU 113 of the IRD 1, transmits it to the MPEG2 video decoder 107 of the IRD 1 via the IEEE1394 cable 8, and performs the graphics process. After that, the processed data is displayed as a smart file picture plane 50 onto the television receiver 3.

The user watches the smart file picture plane 50 displayed on the monitor and confirms the recording date and time of the program recorded on the video tape 206, the genre, the name of the title, the recording time, and the recording system information expressed by "normal", "3 times" (analog), or "digital" (digital).

According to the above construction, in the digital video cassette recording/reproducing apparatus 2, the program data is recorded to the video tape 206 and the program recording information of the program data is automatically recorded in the memory IC 228 of the video cassette. When the video tape 206 on which the program data has been recorded is reproduced, the program recording information is first read out from the memory IC 228 and the smart file picture plane 50 according to the program recording information is displayed on the television receiver 3. Thus, the user can easily confirm the recording date and time of the program recorded on the video tape 206, the genre, the name of the title, the recording time, and the analog/digital recording system information.

Thus, the user recognizes the recording system information of the program to be monitored from now on by watching the smart file picture plane 50 and, if the program to be reproduced has been digitally recorded, the user switches the input to the digital video input of the television receiver 3 in which the reproduction data by the digital video cassette recording/reproducing apparatus 2 is inputted from the IEEE 1394 cable 8 via the IRD 1. If the program to be reproduced has been analog-recorded, the user switches the input to the analog video input of the television receiver 3 in which the analog reproduction signal by the digital video cassette recording/reproducing apparatus 2 is inputted. That is, the user retrieves or recognizes the program to be monitored from now on by watching the smart file picture plane 50 and can select the proper input switching before a desired program is reproduced and monitored.

According to the digital video cassette recording/reproducing apparatus 2, the program recording information which was automatically recorded in the memory IC 228 of the video cassette can be edited by the user. Therefore, not only the program recording information is recorded as it is in the memory IC 228 in a state where it has been added to the program data but also it can be edited again to the desired contents of the user and recorded in the memory IC 228.

Further, according to the digital video cassette recording/reproducing apparatus 2, when the program recording information is automatically recorded in the memory IC 228 of the video cassette on the basis of the control of the CPU 113 of the IRD 1, the name of the genre is converted on the basis of the genre conversion table. Therefore, the function for directly receiving and transmitting Kanji (Chinese character) codes and converting them into Japanese or the like becomes unnecessary, and a circuit construction can be simplified by an amount corresponding to such an unnecessary function.

In the foregoing embodiments, the case where "digital" is displayed in the smart file as recording system information in the case where the data was digitally recorded has been described above. However, the invention is not limited to such a case but it is possible to use one of a construction in which "digital 1" and "digital 2" are recorded and displayed in the smart file in order to distinguish the broadcasting service enterprises, a construction in which "digital CS" and "digital BS" are recorded and displayed in the smart file in order to distinguish the kind of broadcasting data to be digitally recorded, and a construction in which "MPEG2" and "digital HDTV" are recorded and displayed in the smart file in order to distinguish that the transport stream of which specifications has been recorded.

The case where the program data is recorded to the video tape 206 and the program recording information is recorded in the memory IC 228 of the video cassette has been mentioned in the foregoing embodiments. However, the invention is not limited to it but the program data can be recorded to the disk-shaped recording medium and the program recording information can be also recorded in the memory means such as a memory IC or the like adhered to an area other than the data recording region on the disk-shaped recording medium. Also in this case, effects similar to those in the foregoing embodiments can be obtained.

The case where the program data is recorded to the video tape 206 and the program recording information is recorded in the memory IC 228 of the video cassette has been mentioned in the foregoing embodiments. However, the invention is not limited to this but it is also possible to use a construction in which the program data is recorded to the video tape 206, the program recording information is stored in the nonvolatile memory 225 or the like in the digital video cassette recording/reproducing apparatus 2 together with identification data ID of the video tape 206, and in the case where the program recording information is read out and displayed, the ID is discriminated from the loaded video tape 206, the corresponding program recording information is read out, and it is transmitted to the IRD side via the IEEE1394 interface and displayed.

Although the case where the program recording information is recorded in the memory IC 228 of the video cassette in a contactless manner has been mentioned in the above embodiments, the invention is not limited to such a construction but the program recording information can be also recorded in a contact manner.

According to the first embodiment of the invention, in the case where the analog-recorded tape cassette is loaded into the digital video cassette recording/reproducing apparatus and analog-reproduced, the fact that the digital video cassette recording/reproducing apparatus is in the analog reproducing mode is notified to the IRD side. In the case where the digital video cassette recording/reproducing apparatus is in the analog reproducing mode, an alarm message of "During analog reproduction. Cannot be displayed." is displayed. According to the invention, in the case where the tape cassette in which the transport stream of different specifications or the digital video signal of a system other than the MPEG2 system has been recorded is loaded into the digital video cassette recording/reproducing apparatus 2 and reproduced, an alarm message of "Different system. Cannot be displayed." is displayed. As mentioned above, when the tape cassette which cannot be correctly reproduced is reproduced, the alarm message is displayed on the reproduction picture plane. Therefore, the user can correctly recognize the causes by which the reproduction picture plane cannot be displayed, so that he can take a necessary countermeasure such as to select the proper input switching or the like.

According to the second embodiment of the invention, the user recognizes the recording system information of the program to be monitored by watching the smart file picture plane 50 and, if the program to be reproduced has been digitally recorded, he switches the input to the digital video input of the television receiver 3 in which the reproduction data by the digital video cassette recording/reproducing apparatus 2 is inputted from the IEEE1394 cable 8 via the IRD 1. If the program to be reproduced has been analog-recorded, he switches the input to the analog video input of the television receiver 3 in which the analog reproduction signal by the digital video cassette recording/reproducing apparatus 2 is inputted. That is, the user retrieves or recognizes the program to be monitored from now on by watching the smart file picture plane 50 and can select the proper input switching before the desired program is reproduced and monitored.

INDUSTRIAL APPLICABILITY

The invention is suitable when it is applied to the receiving apparatus in the digital broadcasting system in which the receiving apparatus of the digital satellite broadcasting and the digital video cassette recording/reproducing apparatus are connected by, for example, the interface of IEEE1394.

1 . . . IRD
2 . . . DIGITAL VIDEO CASSETTE RECORDING/REPRODUCING APPARATUS
3 . . . TELEVISION RECEIVER
8 . . . IEEE1394 CABLE
107 . . . MPEG2 VIDEO DECODER
229 . . . DATA READING/WRITING UNIT
228 . . . MEMORY IC

The invention claimed is:

1. A receiving apparatus for receiving a digital broadcasting signal constructed by a transport stream in which video data and audio data have been compressed and multiplexed, comprising:
a decoder for decoding said received digital broadcasting signal;
a digital interface for receiving the transport stream from an external reproducing apparatus;
a CPU programmed for retrieving information associated with a program recorded on a recording medium loaded in said reproducing apparatus from a memory in said reproducing apparatus; and
a display processing circuit for displaying the information associated with the program recorded on the recording medium loaded in said reproducing apparatus by a predetermined format,
wherein the decoder is (i) for determining whether the transport stream corresponding to the program recorded on the recording medium reproduced by said reproducing apparatus and received through said digital interface is decodable by said decoder using a predetermined coding system used at the receiving apparatus to decode a transport stream, and (ii) for generating decodability data indicating a result of determining whether the transport stream corresponding to the program recorded on the recording medium reproduced by said reproducing apparatus and received through said digital interface is decodable by said decoder using the predetermined coding system;

wherein in the case where the decodability data indicates the transport stream corresponding to the program recorded on the recording medium reproduced by said reproducing apparatus and received through said digital interface is determined not able to be decoded in said decoder using the predetermined coding system, said display processing circuit performs a display process so as to display a message based on the decodability data and showing that the program recorded on the recording medium loaded in said reproducing apparatus is recorded in a recording mode in which said transport stream corresponding to the program recorded on the recording medium reproduced by said reproducing apparatus and received through said digital interface cannot be decoded by said receiving apparatus using the predetermined coding system;

wherein said information associated with said program is overlapped to a reproduction signal from said reproducing apparatus and displayed.

2. A receiving apparatus for receiving a digital broadcasting signal constructed by a transport stream in which video data and audio data have been compressed and multiplexed, comprising:

a decoder for decoding said received digital broadcasting signal;

a digital interface for receiving a transport stream from a reproducing apparatus; and a display processing circuit for displaying information associated with a program recorded in a predetermined compression format on a recording medium loaded in said reproducing apparatus, wherein the decoder is (i) for determining whether the transport stream corresponding to the program recorded on the recording medium reproduced by said reproducing apparatus and received through said digital interface is decodable by said decoder using a predetermined coding system used at the receiving apparatus to decode a transport stream, and (ii) for generating decodability data indicating a result of determining whether the transport stream corresponding to the program recorded on the recording medium reproduced by said reproducing apparatus and received through said digital interface is decodable by said decoder using the predetermined coding system;

wherein in the case where the decodability data indicates the transport stream corresponding to the program recorded on the recording medium reproduced by said reproducing apparatus and received through said digital interface is determined not able to be decoded in said decoder using the predetermined coding system, said display processing circuit performs a display process so as to display a message based on the decodability data and showing that the program recorded on the recording medium loaded in said reproducing apparatus is recorded in a compression mode in which said transport stream corresponding to the program recorded on the recording medium reproduced by said reproducing apparatus and received through said digital interface cannot be decoded by said receiving apparatus using the predetermined coding system;

wherein said information associated with said program is overlapped to a reproduction signal from said reproducing apparatus and displayed.

3. An apparatus according to claim 2, wherein said information associated with said program includes at least one of a channel number of the program, a program name, a genre, a date of the recording, and a recording time.

4. An apparatus according to claim 2, wherein said information associated with said program includes recording position information of the program on the recording medium.

5. An apparatus according to claim 2, wherein said information associated with said program includes information of a recording mode of said recorded program.

6. A receiving apparatus for receiving a digital broadcasting signal constructed by a transport stream in which video data and audio data have been compressed and multiplexed, comprising:

a decoder for decoding said received digital broadcasting signal;

a digital interface for receiving the transport stream from an external reproducing apparatus; and a display processing circuit for displaying information associated with a program recorded in a predetermined transport stream format on a recording medium loaded in said reproducing apparatus, wherein the decoder is (i) for determining whether the transport stream corresponding to the program recorded on the recording medium reproduced by said reproducing apparatus and received through said digital interface is decodable by said decoder using a predetermined coding system used at the receiving apparatus to decode a transport stream, and, (ii) for generating decodability data indicating a result of determining whether the transport stream corresponding to the program recorded on the recording medium reproduced by said reproducing apparatus and received through said digital interface is decodable by said decoder using the predetermined coding system;

wherein in the case where the decodability data indicates the transport stream corresponding to the program recorded on the recording medium reproduced by said reproducing apparatus and received through said digital interface is determined not able to be decoded in said decoder using the predetermined coding system, said display processing circuit performs a display process so as to display a message based on the decodability data and indicating that the program recorded on the recording medium loaded in said reproducing apparatus is recorded in a format wherein said transport stream corresponding to the program recorded on the recording medium reproduced by said reproducing apparatus and received through said digital interface cannot be decoded by said receiving apparatus using the predetermined coding system;

wherein said information associated with said program is overlapped to a reproduction signal from said reproducing apparatus and displayed.

7. An apparatus according to claim 6, wherein said information associated with said program includes at least one of a channel number of the program, a program name, a genre, a date of the recording, and a recording time.

8. An apparatus according to claim 6, wherein said information associated with said program includes recording position information of the program on the recording medium.

9. An apparatus according to claim 6, wherein said information associated with said program includes information of a recording mode of said recorded program.

10. A display method of recording program associated information in a receiving digital broadcasting signal constructed by a transport stream in which video data and audio data have been compressed and multiplexed, comprising:

receiving a digital broadcasting signal constructed by a transport stream in which video data and audio data have been compressed and multiplexed;

decoding said received digital broadcasting signal;

receiving the transport stream from an external reproducing apparatus through a digital interface;

reading out information associated with a program recorded on a recording medium loaded in said reproducing apparatus from a memory in said reproducing apparatus;

displaying the information associated with the program recorded on the recording medium loaded in said reproducing apparatus by a predetermined format;

determining whether the transport stream corresponding to the program recorded on the recording medium reproduced by said reproducing apparatus and received through the digital interface is decodable using a predetermined coding system used at the receiving apparatus to decode a transport stream; and generating decodability data indicating a result of determining whether the transport stream corresponding to the program recorded on the recording medium reproduced by said reproducing apparatus and received through the digital interface is decodable using the predetermined coding system, wherein in said displaying the information, when the decodability data indicates the transport stream corresponding to the program recorded on the recording medium reproduced in said reproducing apparatus and received through the digital interface is determined not able to be decodable using the predetermined coding system in said determining step, a display process is performed so as to display a message based on the decodability data and showing that the program recorded on the recording medium loaded in said reproducing apparatus is recorded in a recording mode in which the transport stream corresponding to the program recorded on the recording medium reproduced in said reproducing apparatus and received through the digital interface cannot be decoded using the predetermined coding system;

wherein said information associated with said program is overlapped to a reproduction signal from said reproducing apparatus and displayed.

* * * * *